(12) United States Patent
Arai et al.

(10) Patent No.: US 12,478,701 B2
(45) Date of Patent: Nov. 25, 2025

(54) LIGHT EMISSION CONTROL DEVICE AND DISPLAY DEVICE

(71) Applicant: JVCKENWOOD Corporation, Yokohama (JP)

(72) Inventors: Masahito Arai, Yokohama (JP); Hiroshi Takeshita, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 446 days.

(21) Appl. No.: 18/300,450

(22) Filed: Apr. 14, 2023

(65) Prior Publication Data
US 2023/0248870 A1 Aug. 10, 2023

Related U.S. Application Data

(63) Continuation of application No. PCT/JP2021/035001, filed on Sep. 24, 2021.

(30) Foreign Application Priority Data

Dec. 22, 2020 (JP) ................. 2020-212994

(51) Int. Cl.
*A61L 2/10* (2006.01)
*A61L 2/24* (2006.01)
(Continued)

(52) U.S. Cl.
CPC ........ *A61L 2/24* (2013.01); *A61L 2/10* (2013.01); *A61L 2/26* (2013.01); *H05B 47/12* (2020.01);
(Continued)

(58) Field of Classification Search
CPC ..... A61L 2/10; A61L 2/24; A61L 2/26; A61L 2202/11; A61L 2202/14; H05B 47/12
See application file for complete search history.

(56) References Cited

U.S. PATENT DOCUMENTS

2009/0316057 A1 12/2009 Campbell et al.
2020/0408394 A1* 12/2020 Weeks, Jr. .......... F21V 33/0068

FOREIGN PATENT DOCUMENTS

| CN | 110060570 | 7/2019 |
| JP | 2009-521268 | 6/2009 |

(Continued)

OTHER PUBLICATIONS

International Search Report and Written Opinion for International Application No. PCT/JP2021/035001 mailed on Oct. 26, 2021, 10 pages.

*Primary Examiner* — Sean M Luck
(74) *Attorney, Agent, or Firm* — Amin, Turocy & Watson, LLP

(57) ABSTRACT

A light emission control device includes a detection unit configured to detect a user around a display device; a disinfection light source controller configured to control a disinfection light source unit of a wavelength having a disinfecting effect; a light source controller configured to control a light source unit of a wavelength different from the wavelength having the disinfecting effect; and a determination unit configured to determine, based on a detection result by the detection unit, whether no user is around the display device, wherein in a case in which the determination unit determines that no user is around the display device, the light source controller is further configured to control the light source unit to stop emitting light therefrom, and the disinfection light source controller is further configured to control the disinfection light source unit to start emitting light therefrom.

5 Claims, 12 Drawing Sheets

(51) Int. Cl.
  *A61L 2/26* (2006.01)
  *H05B 47/12* (2020.01)
(52) U.S. Cl.
  CPC ........ *A61L 2202/11* (2013.01); *A61L 2202/14* (2013.01)

(56) References Cited

FOREIGN PATENT DOCUMENTS

| | | |
|---|---|---|
| JP | 2010-177179 | 8/2010 |
| JP | 2014-212095 | 11/2014 |
| JP | 2017-029293 | 2/2017 |
| JP | 2020-124281 | 8/2020 |

* cited by examiner

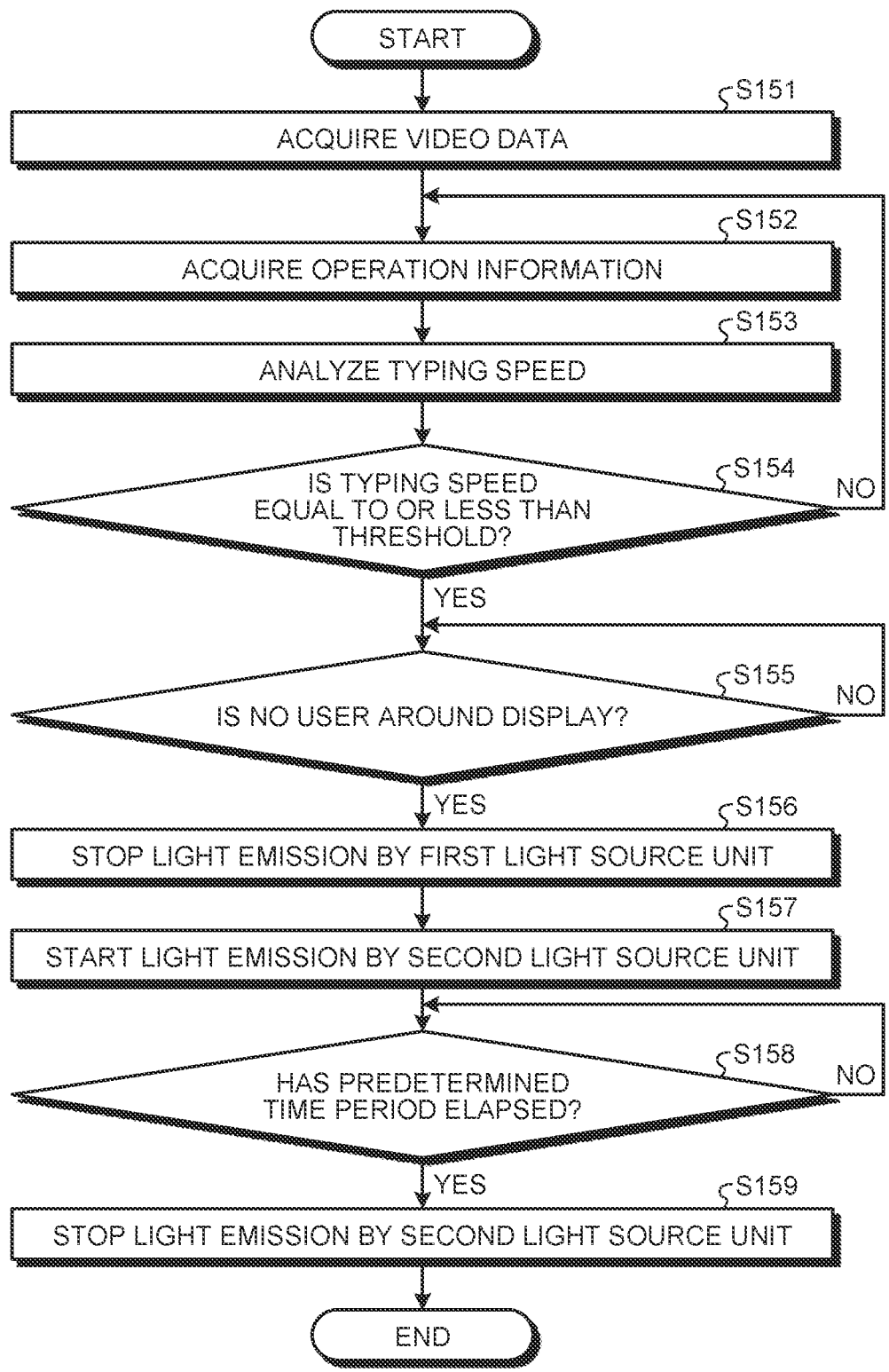

LIGHT EMISSION CONTROL DEVICE AND DISPLAY DEVICE

CROSS-REFERENCE TO RELATED APPLICATIONS

This application is a Continuation of PCT International Application No. PCT/JP2021/035001 filed on Sep. 24, 2021 which claims the benefit of priority from Japanese Patent Application No. 2020-212994 filed on Dec. 22, 2020, the entire contents of both of which are incorporated herein by reference.

FIELD OF THE INVENTION

The present application relates to a light emission control device and a display device.

BACKGROUND OF THE INVENTION

An ultraviolet device has been known which causes an ultraviolet germicidal lamp to be lit up in response to detection of a state where humans are absent and controls the ultraviolet germicidal lamp so that the ultraviolet germicidal lamp is continuously lit up, or lit up for a certain time period and/or periodically lit up (for example, see Japanese Unexamined Patent Application Publication No. 2017-029293).

Along with infection with an infectious disease caused by a virus spreads, for example, occurrence of clusters in a medical site is desired to be contained. As an effective preventive measures against infection with infectious diseases in a medical site include, for example, disinfection of parts touched by users with their hands when the users check images displayed on a display device is effective. However, it requires regular disinfecting work and becomes a big burden on workers in a case in which parts touched by users with the user's hand should be sprayed with a disinfectant and be wiped off the sprayed disinfectant. Furthermore, for an ultraviolet germicidal lamp to effectively function, the ultraviolet germicidal lamp is desirably installed at a place that is near the parts touched by the users with their hands.

A light emission control device and a display device are disclosed.

SUMMARY OF THE INVENTION

According to one aspect of the present application, there is provided a light emission control device, comprising: a detection unit configured to detect a user around a display device; a disinfection light source controller configured to control a disinfection light source unit of a wavelength having a disinfecting effect; a light source controller configured to control a light source unit of a wavelength different from the wavelength having the disinfecting effect; and a determination unit configured to determine, based on a detection result by the detection unit, whether no user is around the display device, wherein in a case in which the determination unit determines that no user is around the display device, the light source controller is further configured to control the light source unit to stop emitting light therefrom, and the disinfection light source controller is further configured to control the disinfection light source unit to start emitting light therefrom.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 13 is a flowchart illustrating a flow of processes at the light emission control device according to the sixth embodiment.

DETAILED DESCRIPTION OF THE INVENTION

Embodiments of a light emission control device and a display device according to the present application will hereinafter be described in detail by reference to the appended drawings. The present application is not limited by the following embodiments.

First Embodiment

Display Device

Figure 1:
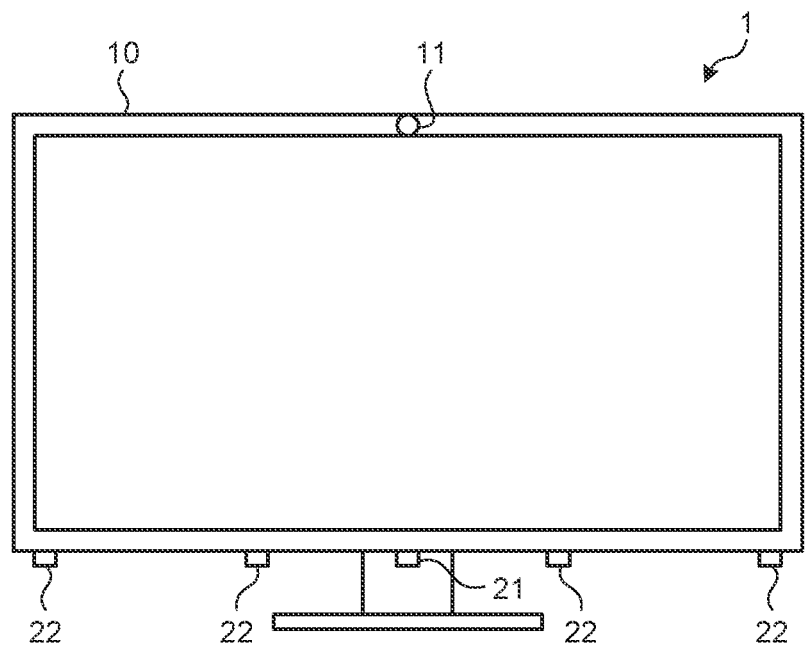
FIG. 1 is a schematic diagram illustrating a simple overview of a display device.
Figure 2:
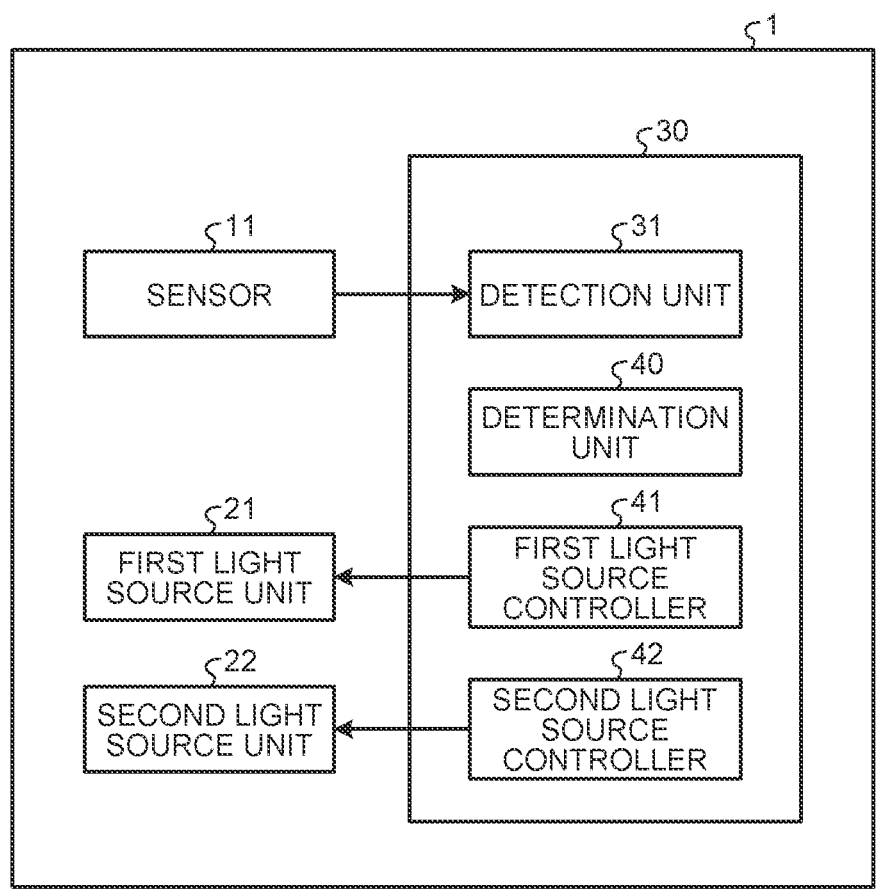
FIG. 2 is a block diagram illustrating an example of a configuration of the display device having a light emission control device according to a first embodiment.

FIG. 1 is a schematic diagram illustrating a simple overview of a display device 1. FIG. 2 is a block diagram illustrating an example of a configuration of the display device 1 having a light emission control device 30 according to a first embodiment. The display device 1 is connected to, for example, a computer, and displays images and videos. The display device 1 is, for example: a display device for a computer, or an image reading device. The display device 1 has a main body unit 10, a sensor 11, a first light source unit (reading light source) 21, a second light source unit (disinfection light source) 22, and the light emission control device 30. In this embodiment, the display device 1 has the sensor 11, but the display device 1 may be without the sensor 11.

The main body unit 10 is a casing of the display device 1.

The sensor 11 is a sensor that is capable of detecting presence and absence of any human around the display device 1. The sensor 11 outputs sensor data to a detection unit 31 of the light emission control device 30.

The sensor 11 may be, for example, a human sensor. The sensor 11 detects any user around the display device 1. Various forms of sensors, such as, for example, an infrared sensor, an ultrasonic sensor, a millimeter-wave sensor, an image recognition sensor, and a combination of multiple forms of sensors are applicable to the sensor 11. Data output from a human sensor to the detection unit 31 enable direct detection of presence of any user around the display device 1.

The sensor 11 may be, for example, an illuminance sensor. The sensor 11 detects illuminance around the display device 1. In a case in which an area around the display device 1 is dark, no one is likely to be around the display device 1. Accordingly, data output from an illuminance sensor to the detection unit 31 enables indirect detection of presence of any user around the display device 1.

The display device 1 may have, instead of the sensor 11, a schedule data storage unit that stores therein schedule data. Illustration of the schedule data storage unit is omitted. The schedule data is, for example, data indicating any time slot during which no user is around the display device 1. The schedule data is, for example, data indicating a time slot during which the second light source unit 22 is to be lit up. A time slot during which no user is around the display device 1 is set as a time slot during which the second light source unit 22 is to be lit up. As described above, the schedule data enable indirect detection of presence of any user around the display device 1.

The display device 1 may have, instead of the sensor 11, an interface unit that acquires operation information indicating an operation state of an electronic device, such as a computer connected to the display device 1. Illustration of the interface unit has been omitted. The interface unit acquires operation information indicating that the electronic device is in a power off or resting state. In a case in which the electronic device is in the power off or resting state, no one is likely to be around the display device 1. As described above, the operation information on the electronic device enables indirect detection of presence of any user around the display device 1.

The display device 1 may have, instead of the sensor 11, an interface unit that acquires operation information indicating an operation state of the display device 1 from a display controller of the display device 1, the display controller not being illustrated in the drawings. Illustration of the interface unit has been omitted. The interface unit acquires, from the display controller, operation information indicating that the display device 1 is in an off or resting state. In a case in which the display device 1 is in the off or resting state, no one is likely to be around the display device 1. As described above, the operation information on the display device 1 enables indirect detection of presence of any user around the display device 1.

The first light source unit 21 irradiates an area below the main body unit 10 of the display device 1, with light having a first wavelength longer than that of the second light source unit 22. The first light source unit 21 is used as a so-called reading light. The first light source unit 21 is used for, for example, a document to be read below the display device 1. The first light source unit 21 uses light of a wavelength having no effect of inactivating viruses or a lower effect of inactivating viruses than the second light source unit 22. In this embodiment, the first light source unit 21 irradiates the area below the main body unit 10 of the display device 1, with the light having the first wavelength that is longer than 280 nm. The first light source unit 21 includes a light emitting element that emits the light having the first wavelength. The first light source unit 21 is arranged at a lower portion of the main body unit 10. The first light source unit 21 emits the light based on a control signal from a first light source controller 41. The first light source unit 21 is, for example, a light emitting diode (LED).

The second light source unit 22 irradiates an area below the main body unit 10 of the display device 1, with light having a second wavelength shorter than that of the first light source unit 21. The second light source unit 22 is used as a so-called disinfection light. The second light source unit 22 uses light having a wavelength with an effect of inactivating viruses or a higher effect of inactivating viruses than the first light source unit 21. The second light source unit 22 includes a light emitting element that emits far ultraviolet light having a wavelength of 200 nm or longer and 280 nm or shorter. The second light source unit 22 emits light having a wavelength with a high effect of disinfecting viruses that cause infectious diseases. The second light source unit 22 is arranged at a lower portion of the main body unit 10. In this embodiment, the multiple second light source units 22 are arranged at the lower portion of the main body unit 10. The second light source units 22 emit light, from the lower portion of the main body unit 10, to an area around an input device such as a keyboard and the main body unit 10. The second light source unit 22 emits the light based on a control signal from a second light source controller 42.

Light Emission Control Device

The light emission control device 30 is an arithmetic processing device (control device) including, for example, a central processing unit (CPU). The light emission control device 30 loads a stored program into a memory and executes commands included in the program. The light emission control device 30 includes an internal memory not illustrated in the drawings, and the internal memory is used for temporary storage of data at the light emission control device 30. The light emission control device 30 may be a built-in device in the main body unit 10 of the display device 1 or may be mounted in the electronic device. The light emission control device 30 has a detection unit 31, a determination unit 40, the first light source controller (reading light source controller) 41, and the second light source controller (disinfection light source controller) 42.

The detection unit 31 acquires data that enable detection of presence of any user around the display device 1, in other words, whether or not there is any user around the display device 1. For example, in this embodiment, the detection unit 31 acquires sensor data from the sensor 11. The detection unit 31 outputs a detection result detected, to the determination unit 40. More specifically, the detection unit 31 may acquire the sensor data from the sensor 11 that is, for example, a human sensor. The detection unit 31 may acquire the sensor data from the sensor 11 that is, for example, an illuminance sensor. The detection unit 31 may acquire, instead of the sensor data acquired from the sensor 11, the schedule data from the schedule data storage unit not illustrated in the drawings, for example. The detection unit 31 may acquire from, instead of the sensor 11, the interface unit not illustrated in the drawings, the operation information indicating the operation state of the electronic device such as a computer connected to the display device 1, for example. The detection unit 31 may acquire, instead of the sensor data acquired from the sensor 11, the operation information indicating the operation state of the display device 1 from the interface unit not illustrated in the drawings, for example. As described above, the detection unit 31 acquires data directly or indirectly indicating whether any user is around the display device 1.

The determination unit 40 determines, based on a detection result from the detection unit 31, whether no user is around the display device 1. In a case in which a state in which no user is around the display device 1 has been maintained for a predetermined time period, the determination unit 40 may determine that there is no user. Light emitted from the second light source units 22 in a state in which there is a user around the display device 1 may harm a body of the user. The determination unit 40 thus determines absence of a user around the display device 1. In this embodiment, based on sensor data detected by the detection unit 31 as a detection result, the determination unit 40 determines whether no user is around the display device 1.

For example, based on sensor data acquired from the sensor 11 that is a human sensor, the determination unit 40 may determine whether no user is around the display device 1. More specifically, in a case in which the sensor data does not indicate detection of a user, the determination unit 40 determines that no user is around the display device 1.

For example, based on sensor data acquired from the sensor 11 that is an illuminance sensor, the determination unit 40 may determine whether no user is around the display device 1. More specifically, in a case in which the sensor data indicate an illuminance equal to or less than a threshold illuminance, the determination unit 40 determines that no user is around the display device 1. This is because in this case, lights in the room in which the display device 1 is installed are likely to have been turned off and no user is likely to be around the display device 1.

For example, based on the schedule data acquired from the schedule data storage unit, the determination unit 40 may determine whether no user is around the display device 1. More specifically, in a case in which the current time is in the time slot of the schedule data indicating the time slot during which no user is around the display device 1, the determination unit 40 determines that no user is around the display device 1.

For example, based on the operation information acquired from the interface unit and indicating the operation state of the electronic device, the determination unit 40 may determine whether no user is around the display device 1. More specifically, in a case in which the operation state of the electronic device is the power off or resting state, the determination unit 40 determines that no user is around the display device 1.

For example, based on the operation information acquired from the interface unit and indicating the operation state of the display device 1, the determination unit 40 may determine whether no user is around the display device 1. More specifically, in a case in which the operation state of the display device 1 is the off or resting state, the determination unit 40 determines that no user is around the display device 1.

The first light source controller 41 controls the first light source unit 21. More specifically, the first light source controller 41 controls, for example, a switching between an emission state and a non-emission state of the first light source unit 21 and amount of light emitted by the first light source unit 21 in the emission state. The first light source controller 41 controls the first light source unit 21 to emit light. In this embodiment, in response to detection of operation for lighting up the first light source unit 21, the first light source controller 41 controls the first light source unit 21 to emit light. In this embodiment, in response to detection of operation for turning off the first light source unit 21, the first light source controller 41 controls the first light source unit 21 to stop emitting light.

In a case in which the determination unit 40 has determined that no user is around the display device 1, the first light source controller 41 controls the first light source unit 21 to stop emitting light.

The second light source controller 42 controls the second light source unit 22. More specifically, the second light source controller 42 controls, for example, a switching between an emission state and a non-emission state of the second light source unit 22 and amount of light emitted by the second light source unit 22 in the emission state. The second light source controller 42 controls the second light source unit 22 to emit light.

In a case in which the determination unit 40 has determined that no user is around the display device 1, the second light source controller 42 controls the second light source unit 22 to start emitting light.

In a case in which a predetermined time period has elapsed since the light emission by the second light source unit 22 was started, the second light source controller 42 controls the second light source unit 22 to stop emitting light. The second light source controller 42 has a function as a timer that measures an elapsed time from start to stop of the light emission by the second light source unit 22.

Process at Light Emission Control Device

Figure 3:
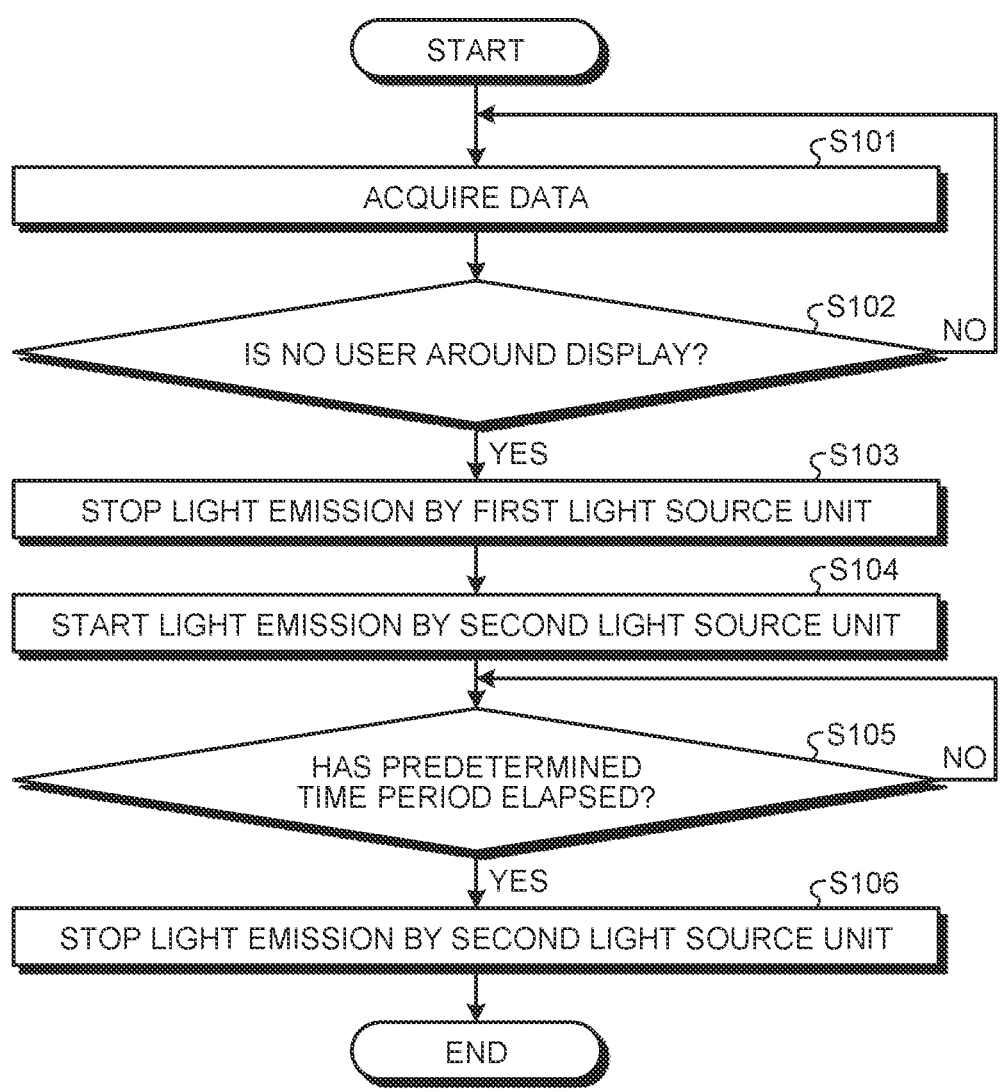
FIG. 3 is a flowchart illustrating a flow of processes at the light emission control device according to the first embodiment.

A flow of processes at the light emission control device 30 will be described next by use of FIG. 3. FIG. 3 is a flowchart illustrating a flow of process at the light emission control device 30 according to the first embodiment. While the power of the electronic device is on or while the power of the display device 1 is on, the light emission control device 30 executes the processes illustrated in FIG. 3.

The light emission control device 30 acquires data by the detection unit 31 (Step S101). In this embodiment, the light emission control device 30 acquires sensor data from the sensor 11, by the detection unit 31. The light emission control device 30 may acquire, for example, sensor data from the sensor 11 that is a human sensor, by the detection unit 31. The light emission control device 30 may acquire, for example, sensor data from the sensor 11 that is an illuminance sensor, by the detection unit 31. The light emission control device 30 may acquire from, instead of the sensor 11, the schedule data storage unit, the schedule data, for example, by the detection unit 31. By the detection unit 31, the light emission control device 30 may acquire from, instead of the sensor 11, the interface unit, for example, operation information indicating the operation state of the electronic device such as a computer connected to the display device 1. By the detection unit 31, the light emission control device 30 may acquire from, instead of the sensor 11, the interface unit, for example, operation information indicating the operation state of the display device 1. The light emission control device 30 proceeds to Step S102.

By the determination unit 40, the light emission control device 30 determines whether no user is around the display device 1 (Step S102). More specifically, by the determination unit 40, the light emission control device 30 determines, based on the detection result from the detection unit 31, whether no user is around the display device 1. In a case in which the determination unit 40 determines that no user is around the display device 1 (Yes at Step S102), the light emission control device 30 proceeds to Step S103. In a case in which the determination unit 40 determines that a user is around the display device 1 (No at Step S102), the light emission control device 30 executes the process at Step S101 again.

In a case in which it is determined that no user is around the display device 1 (Yes at Step S102), the light emission control device 30 controls, by the first light source controller 41, the first light source unit 21 to stop emitting light (Step S103). The light emission control device 30 proceeds to Step S104.

By the second light source controller 42, the light emission control device 30 controls the second light source unit 22 to start emitting light (Step S104). The light emission control device 30 proceeds to Step S105.

The light emission control device 30 determines whether or not a predetermined time period has elapsed since the light emission by the second light source unit 22 was started (Step S105). The elapsed time from the start of the light emission by the second light source unit 22 is measured by the second light source controller 42. The predetermined time period is, for example, about several tens of seconds or more and about several minutes or less. In a case in which the light emission control device 30 determines that the predetermined time period has elapsed (Yes at Step S105), the light emission control device 30 proceeds to Step S106. In a case in which the light emission control device 30 determines that the predetermined time period has not elapsed (No at Step S105), the light emission control device 30 executes the process at Step S105 again.

In a case in which it is determined that the predetermined time period has elapsed (Yes at Step S105), the light emission control device 30 controls, by the second light source controller 42, the second light source unit 22 to stop emitting light (Step S106). The light emission control device 30 ends the processes.

As described above, in this embodiment, the second light source controller 42 controls the second light source unit 22 to start emitting light. This embodiment enables disinfection of the area around the input device and the main body unit 10 in a case in which no user is around the display device 1. The embodiment enables disinfection of a range around the input device and the main body unit 10, the range being likely to have been touched by a user with the user's hand upon use of the display device 1 by the user. The embodiment enables adequate disinfection of parts touched by a user with the user's hand upon the user checking images displayed on the display device 1, for example. In this embodiment, the user does not need to spray/wipe off the disinfectant to/from the area around the input device and the main body unit 10. This embodiment enable adequate disinfection of a non-flat portion such as a keyboard by far-ultraviolet rays. The embodiment enables reduction of the user's labor required for disinfection of the area around the input device and the main body unit 10.

In this embodiment, in a case in which no user is around the display device 1, control is performed such that the first light source unit 21 is turned off and the second light source unit 22 is turned on to start emitting light. The embodiment enables an appropriate switching between the first light source unit 21 and the second light source unit 22.

Second Embodiment

Figure 4:
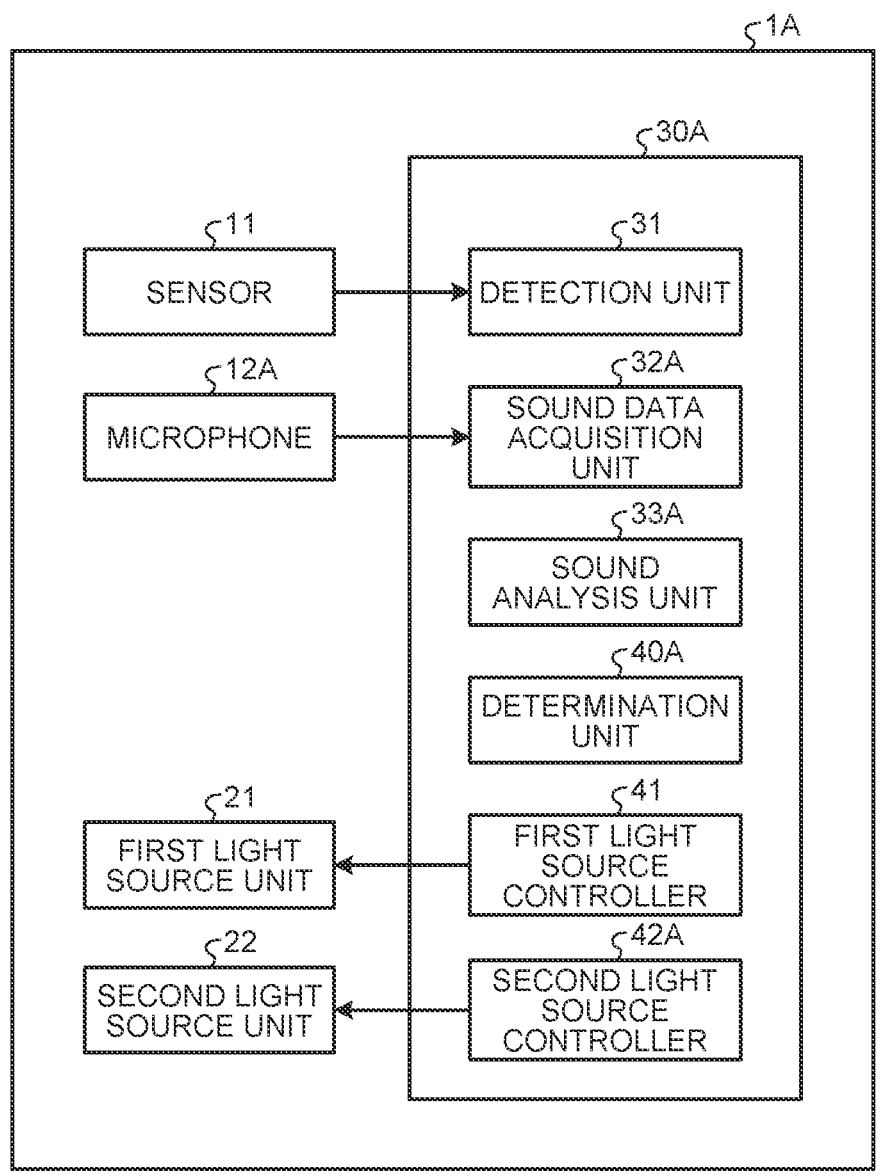
FIG. 4 is a block diagram illustrating an example of a configuration of a display device having a light emission control device according to a second embodiment.
Figure 5:
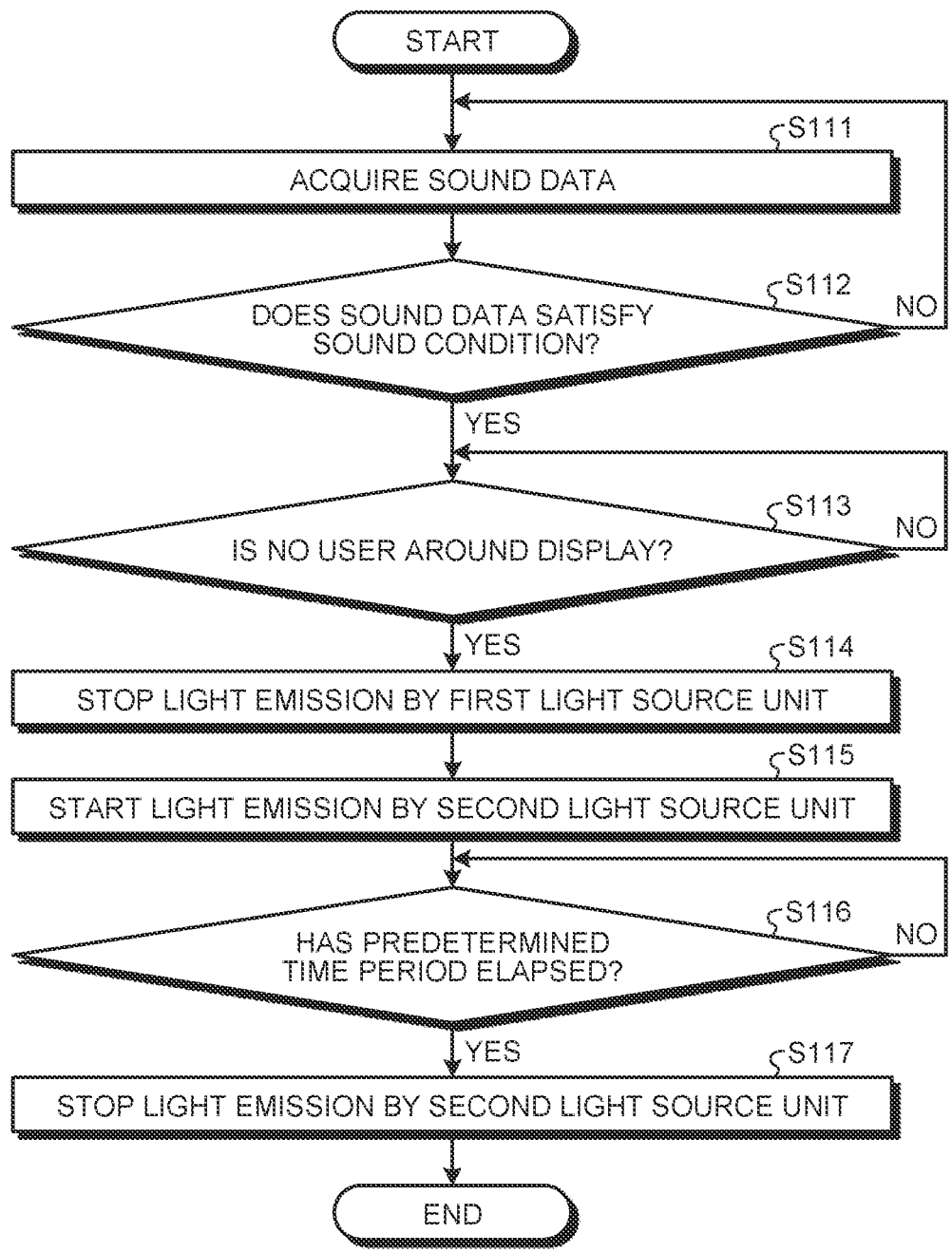
FIG. 5 is a flowchart illustrating a flow of processes at the light emission control device according to the second embodiment.

A display device 1A according to a second embodiment will be described while reference is made to FIG. 4 and FIG. 5. FIG. 4 is a block diagram illustrating an example of a configuration of the display device 1A having a light emission control device 30A according to the second embodiment. FIG. 5 is a flowchart illustrating a flow of processes at the light emission control device 30A according to the second embodiment. Basic configurations of the display device 1A and the light emission control device 30A are similar to those of the display device 1 and the light emission control device 30 of the first embodiment. The same or corresponding reference sign will be assigned to any component that is the same as or similar to that of the display device 1 and the light emission control device 30 in the following description and detailed description thereof will be omitted.

The display device 1A is different from that of the first embodiment in that the display device 1A has a microphone 12A, as well as a sound data acquisition unit 32A and a sound analysis unit 33A that are included in the light emission control device 30A, and in the processes at a determination unit 40A and a second light source controller 42A.

The microphone 12A collects sound around the display device 1A. The microphone 12A outputs sound data collected, to the sound data acquisition unit 32A.

The sound data acquisition unit 32A acquires sound data collected by the microphone 12A. The sound data acquisition unit 32A outputs the sound data acquired, to the sound analysis unit 33A.

The sound analysis unit 33A analyzes the sound data acquired by the sound data acquisition unit 32A. The sound analysis unit 33A detects sound such as a user's utterance and coughing around the main body unit 10 by analyzing the sound data and measures the number of times or the time period of the utterance and coughing. A method used to analyze the user's utterance and coughing from the sound data is not limited and may be a publicly known method.

Further based on an analysis result from the sound analysis unit 33A, the determination unit 40A determines whether or not the sound data satisfy a sound condition under which an area around the input device and the main body unit 10 is determined to be preferably disinfected. More specifically, based on the analysis result from the sound analysis unit 33A, and whether or not the number of times of the detection of the sound is equal to or more than a detection count threshold or whether or not the time period of the detection of the sound is equal to or longer than a detection time threshold, the determination unit 40A determines whether or not the sound condition is satisfied.

Based on the analysis result from the sound analysis unit 33A, the determination unit 40A determines that the sound condition is satisfied, in a case in which the number of times of the detection of the sound is equal to or more than the detection count threshold. Based on the analysis result from the sound analysis unit 33A, the determination unit 40A determines that the sound condition is satisfied, in a case in which the time period of the detection of the sound is equal to or longer than the detection time threshold.

As the number of times of the detection of the sound or the time period of the detection of the sound increases, the possibility that droplets have adhered to the area around the input device such as a keyboard and the main body unit 10 increases, and the area around the input device and the main body unit 10 is thus preferably disinfected.

Based on a determination result from the determination unit 40A, the second light source controller 42A controls the second light source unit 22 to start emitting light in a case in which the sound condition is satisfied and no user is around the main body unit 10.

A flow of processes at the light emission control device 30A will be described next by use of FIG. 5. At Step S113 to Step S117, processes similar to those from Step S102 to Step S106 of the flowchart illustrated in FIG. 3 are performed.

The light emission control device 30A acquires, by the sound data acquisition unit 32A, the sound data from the microphone 12A (Step S111). The light emission control device 30A then proceeds to Step S112.

The light emission control device 30A determines whether or not the sound data satisfy the sound condition (Step S112). More specifically, by the sound analysis unit 33A, the light emission control device 30A detects sound such as a user's utterance and coughing around the main body unit 10 by making an analysis of the sound data and measures the number of times or the time period of the utterance and coughing. By the determination unit 40A, the light emission control device 30A then determines whether or not the sound data satisfy the sound condition based on a result of the analysis by the sound analysis unit 33A. By the determination unit 40A, based on the result of the analysis by the sound analysis unit 33A, the light emission control device 30A determines, in a case in which the number of times of the detection of the sound is equal to or more than the detection count threshold, that the sound condition is satisfied (Yes at Step S112) and proceeds to Step S113. By the determination unit 40A, based on the result of the analysis by the sound analysis unit 33A, the light emission control device 30A determines, in a case in which the time period of the detection of the sound is equal to or longer than the detection time threshold, that the sound condition is satisfied (Yes at Step S112) and proceeds to Step S113. By the determination unit 40A, based on the result of the analysis by the sound analysis unit 33A, the light emission control device 30A determines, in a case in which the number of times of the detection of the sound is less than the detection count threshold, that the sound condition is not satisfied (No at Step S112) and the light emission control device 30A executes the process at Step S111 again. By the determination unit 40A, based on the result of the analysis by the sound analysis unit 33A, the light emission control device 30A determines, in a case in which the time period of the detection of the sound is shorter than the detection time threshold, that the sound condition is not satisfied (No at Step S112) and the light emission control device 30A executes the process at Step S111 again.

As described above, in a case in which the area around the input device such as a keyboard and the main body unit 10 has likely been touched by a user with the user's hand and droplets have likely adhered to the area, the embodiment enables disinfection of the area.

Third Embodiment

Figure 6:
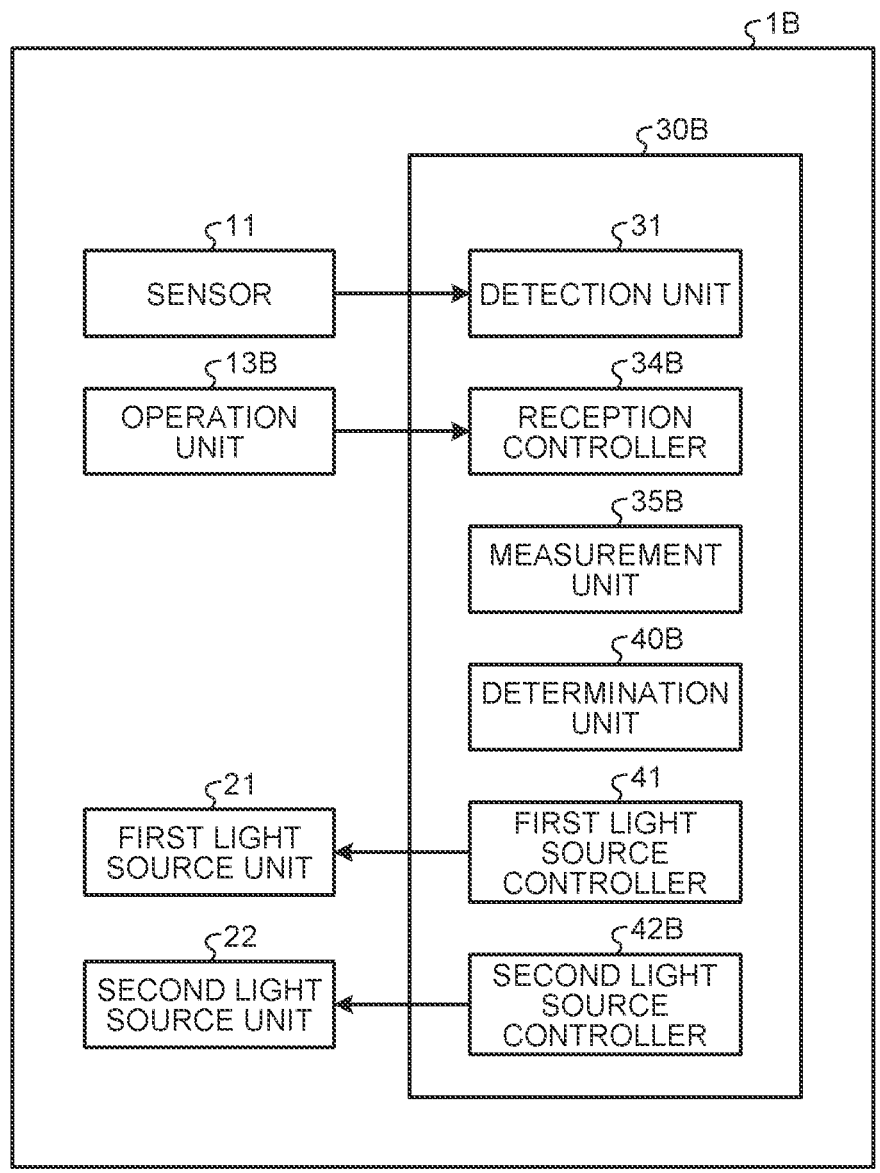
FIG. 6 is a block diagram illustrating an example of a configuration of a display device having a light emission control device according to a third embodiment.
Figure 7:
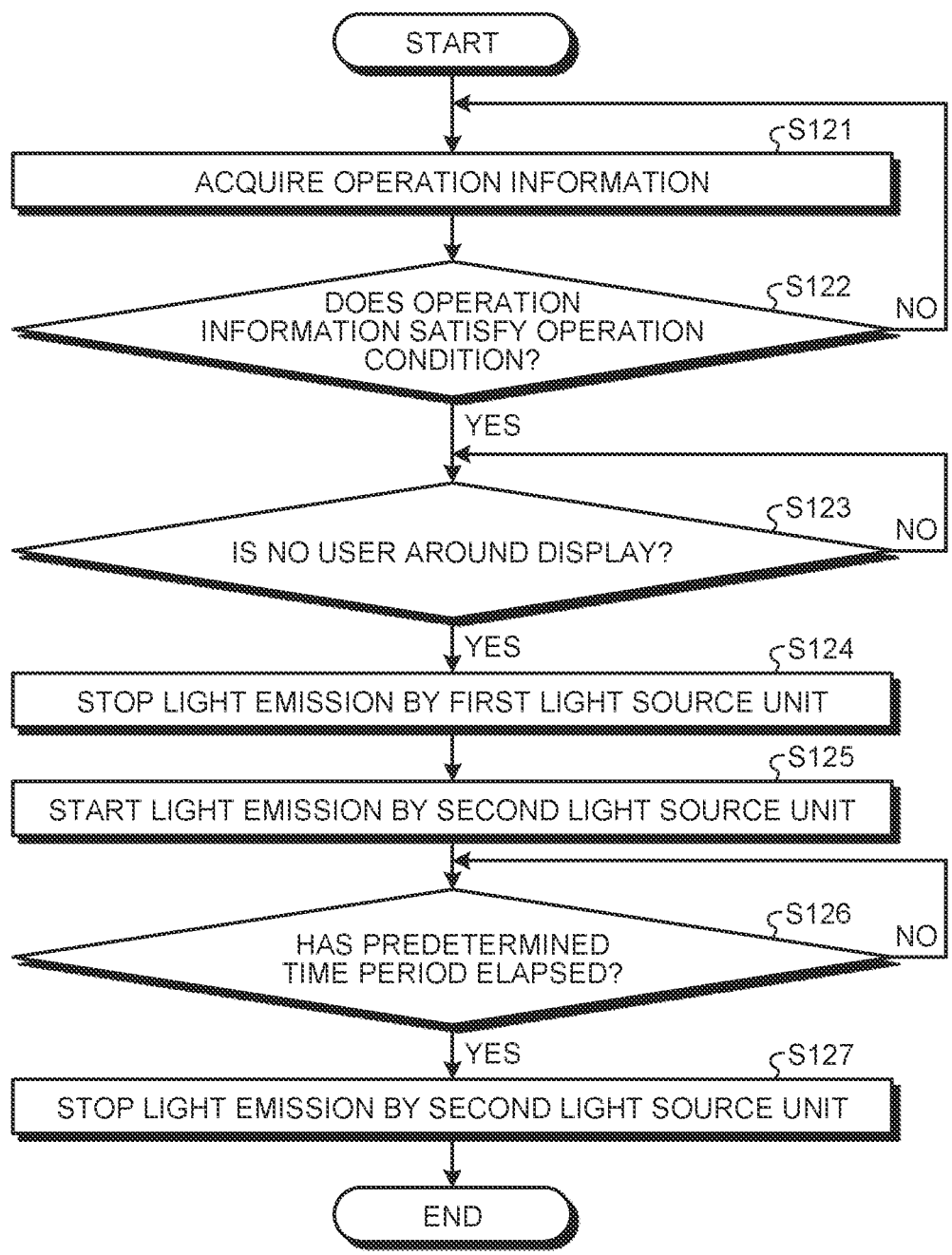
FIG. 7 is a flowchart illustrating a flow of processes at the light emission control device according to the third embodiment.

A display device 1B according to a third embodiment will be described while reference is made to FIG. 6 and FIG. 7. FIG. 6 is a block diagram illustrating an example of a configuration of the display device 1B having a light emission control device 30B according to the third embodiment. FIG. 7 is a flowchart illustrating a flow of processes at the light emission control device 30B according to the third embodiment. Basic configurations of the display device 1B and the light emission control device 30B are similar to those of the display device 1 and the light emission control device 30 of the first embodiment.

The display device 1B is different from that of the first embodiment in that the display device 1B has an operation unit 13B, as well as a reception controller 34B and a measurement unit 35B that are in the light emission control device 30B, and in the processes at a determination unit 40B and a second light source controller 42B.

The operation unit 13B is capable of receiving various types of operation related to the display device 1B. The operation unit 13B is, for example, an input device such as buttons provided on the main body unit 10, a keyboard, and a mouse. The operation unit 13B outputs a signal indicating any operation received, to the reception controller 34B.

The reception controller 34B controls reception of any operation on the operation unit 13B. More specifically, the reception controller 34B acquires operation information on the operation received by the operation unit 13B. The reception controller 34B outputs a control signal corresponding to the operation information, to the display device 1B.

The measurement unit 35B measures the number of times of the operation by the operation unit 13B of the display device 1B by a user or the time period of the operation by the operation unit 13B of the display device 1B by a user.

The measurement unit 35B measures the number of times of the operation by the operation unit 13B. More specifically, in response to start of use of the display device 1B, the measurement unit 35B resets a count of the operation to zero to start measurement. Based on the operation information acquired by the reception controller 34B, the measurement unit 35B measures the number of times of the operation.

The measurement unit 35B measures the time period of the operation by the operation unit 13B. More specifically, in response to start of use of the display device 1B, the measurement unit 35B resets the time period to zero to start measurement. Based on the operation information acquired by the reception controller 34B, the measurement unit 35B measures the time period of the operation.

The measurement unit 35B may further measure a time interval between the operations.

Further based on the measurement result from the measurement unit 35B, the determination unit 40B determines whether or not the number of times of the operation by the operation unit 13B or the time period of the operation by the operation unit 13B satisfies an operation condition. More specifically, further based on the measurement result from the measurement unit 35B, the determination unit 40B determines, based on whether or not the number of times of the operation by the operation unit 13B or the time period of the operation by the operation unit 13B exceeds a threshold, whether or not the operation condition is satisfied. In this embodiment, based on the measurement result from the measurement unit 35B, in a case in which the number of times of the operation by the operation unit 13B exceeds an operation count threshold, the determination unit 40B determines that the operation condition is satisfied. Based on the measurement result from the measurement unit 35B, in a case in which the time period of the operation by the operation unit 13B exceeds an operation time threshold, the determination unit 40B determines that the operation condition is satisfied.

The operation condition is a condition under which an area around the input device and the main body unit 10 is determined to be preferably disinfected due to the operation on the display device 1B.

As the number of times or the time period of any operation increases, the possibility that a number of contacts between the area around the input device such as a keyboard and the main body unit 10 and a user's hand increases becomes higher, and the area around the input device and the main body unit 10 is thus preferably disinfected.

Based on the measurement result from the measurement unit 35B, the determination unit 40B may determine that operation has been resumed, in a case in which an interval between the previous operation and the current operation is equal to or smaller than an interval threshold. Based on the measurement result from the measurement unit 35B, the determination unit 40B may determine that operation has been interrupted, in a case in which the interval between an end of the last operation to the next operation is longer than the interval threshold.

The area around the input device and the main body unit 10 may be disinfected before use when the operation is started or the operation is resumed. When the operation is interrupted, since the area around the input device and the main body unit 10 may have become unclean due to the use, the area may be disinfected in preparation for the next use.

The second light source controller 42B controls the second light source unit 22 to start emitting light in a case in which the operation condition is satisfied and no user is around the main body unit 10. Based on the determination result from the determination unit 40B, in a case in which the number of times of the operation by the operation unit 13B or the time period of the operation by the operation unit 13B exceeds the threshold and no user is around the main body unit 10, the second light source controller 42B controls the second light source unit 22 to start emitting light.

In a case in which it is determined that the operation has been interrupted, the second light source controller 42B may control the second light source unit 22 to emit light.

A flow of processes at the light emission control device 30B will be described next by use of FIG. 7. At Step S123 to Step S127, processes similar to those from Step S102 to Step S106 of the flowchart illustrated in FIG. 3 are performed.

The light emission control device 30B acquires, by the reception controller 34B, operation information from the operation unit 13B (Step S121). The light emission control device 30B proceeds to Step S122.

The light emission control device 30B determines whether or not the operation information satisfies the operation condition (Step S122). More specifically, the light emission control device 30B measures, by the measurement unit 35B, the number of times of the operation by the operation unit 13B of the display device 1B by the user or the time period of the operation by the operation unit 13B of the display device 1B by the user. Based on the measurement result by the measurement unit 35B, whether or not the operation information satisfies the operation condition is determined. In a case in which the number of times of the operation by the operation unit 13B is equal to or more than the operation count threshold, the light emission control device 30B determines, by the determination unit 40B, based on the measurement result by the measurement unit 35B, that the operation condition is satisfied (Yes at Step S122) and proceeds to Step S123. In a case in which the time period of the operation is equal to or longer than the operation time threshold, the light emission control device 30B determines, by the determination unit 40B, based on the measurement result by the measurement unit 35B, that the operation condition is satisfied (Yes at Step S122) and the light emission control device 30B proceeds to Step S123. In a case in which the number of times of the operation by the operation unit 13B is less than the operation count threshold, the light emission control device 30B determines, by the determination unit 40B, based on the measurement result by the measurement unit 35B, that the operation condition is not satisfied (No at Step S122) and the light emission control device 30B executes the process at Step S121 again. In a case in which the time period of the operation is shorter than the operation time threshold, the light emission control device 30B determines, by the determination unit 40B, based on the measurement result by the measurement unit 35B, that the operation condition is not satisfied (No at Step S122) and the light emission control device 30B executes the process at Step S121 again.

As described above, in a case in which the possibility that the number of contacts between the area around the input device such as a keyboard and the main body unit 10 and a user's hand increases is high, the embodiment enables disinfection of the area around the input device and the main body unit 10.

Fourth Embodiment

Figure 8:
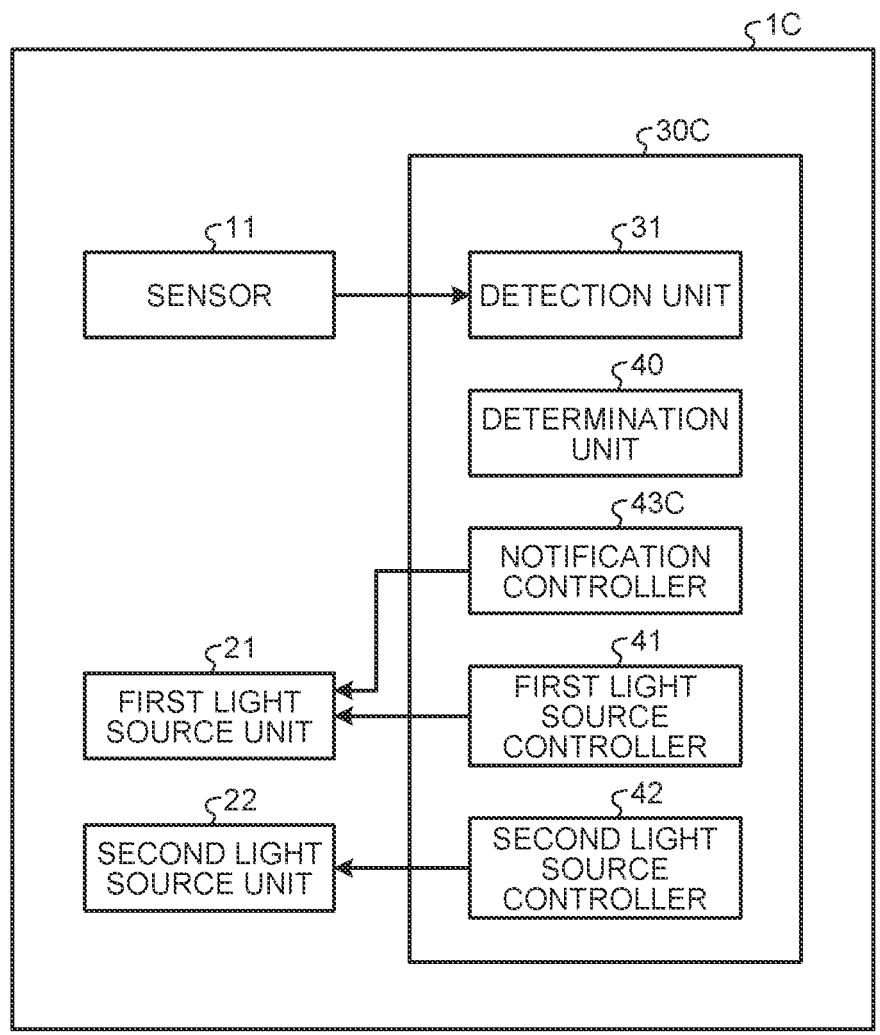
FIG. 8 is a block diagram illustrating an example of a configuration of a display device having a light emission control device according to a fourth embodiment.
Figure 9:
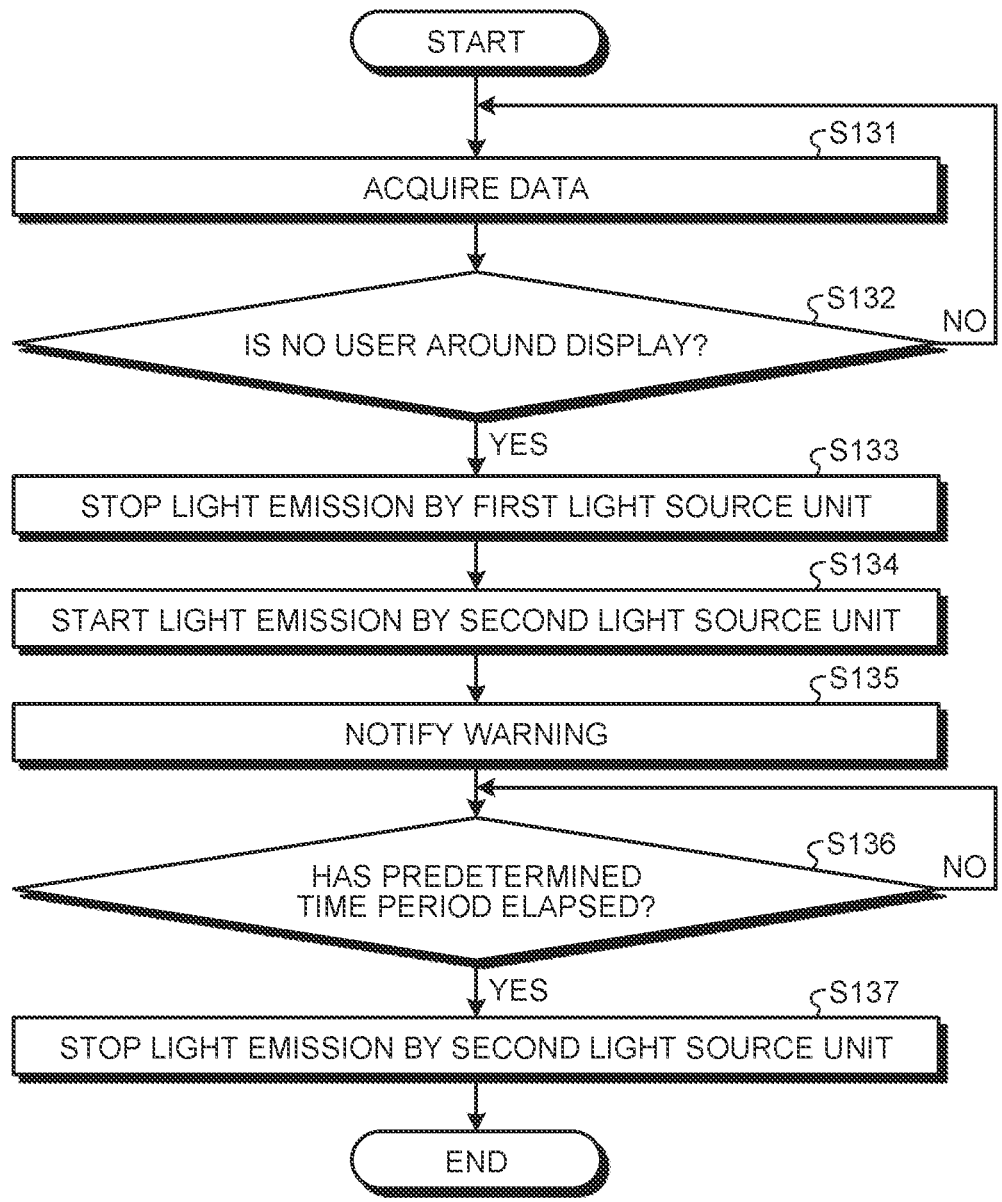
FIG. 9 is a flowchart illustrating a flow of processes at the light emission control device according to the fourth embodiment.

A display device 1C according to a fourth embodiment will be described while reference is made to FIG. 8 and FIG. 9. FIG. 8 is a block diagram illustrating an example of a configuration of the display device 1C having a light emission control device 30C according to the fourth embodiment. FIG. 9 is a flowchart illustrating a flow of processes at the light emission control device 30C according to the fourth embodiment. Basic configurations of the display device 1C and the light emission control device 30C are similar to those of the display device 1 and the light emission control device 30 of the first embodiment.

The display device 1C is different from that of the first embodiment in that the light emission control device 30C has a notification controller 43C.

The notification controller 43C controls notification of a lighting state of a second light source unit 22. In this embodiment, the notification controller 43C performs control to warn for an area around the display device 1C that the second light source unit 22 has been lit up in a case in which the second light source unit 22 is in a lit state. In this embodiment, the notification controller 43C controls the first light source unit 21 to be lit up as a warning. The notification controller 43C may control the first light source unit 21 to be lit up in a mode different from that when the first light source unit 21 is normally lit up, for example, to cause the first light source unit 21 to blink.

A flow of processes at the light emission control device 30C will be described next by use of FIG. 9. At Step S131 to Step S134, Step S136, and Step S137, processes similar to those at Step S101 to Step S104, Step S105, and Step S106 are performed.

The light emission control device 30C notifies a warning (Step S135). More specifically, by the notification controller 43C, the light emission control device 30C causes the first light source unit 21 to blink.

As described above, in a case in which the second light source unit 22 is in the lit state, this embodiment enables anybody around the display device 1C to be warned of the fact that the second light source unit 22 has been lit. This embodiment enables safer disinfection.

Fifth Embodiment

Figure 10:
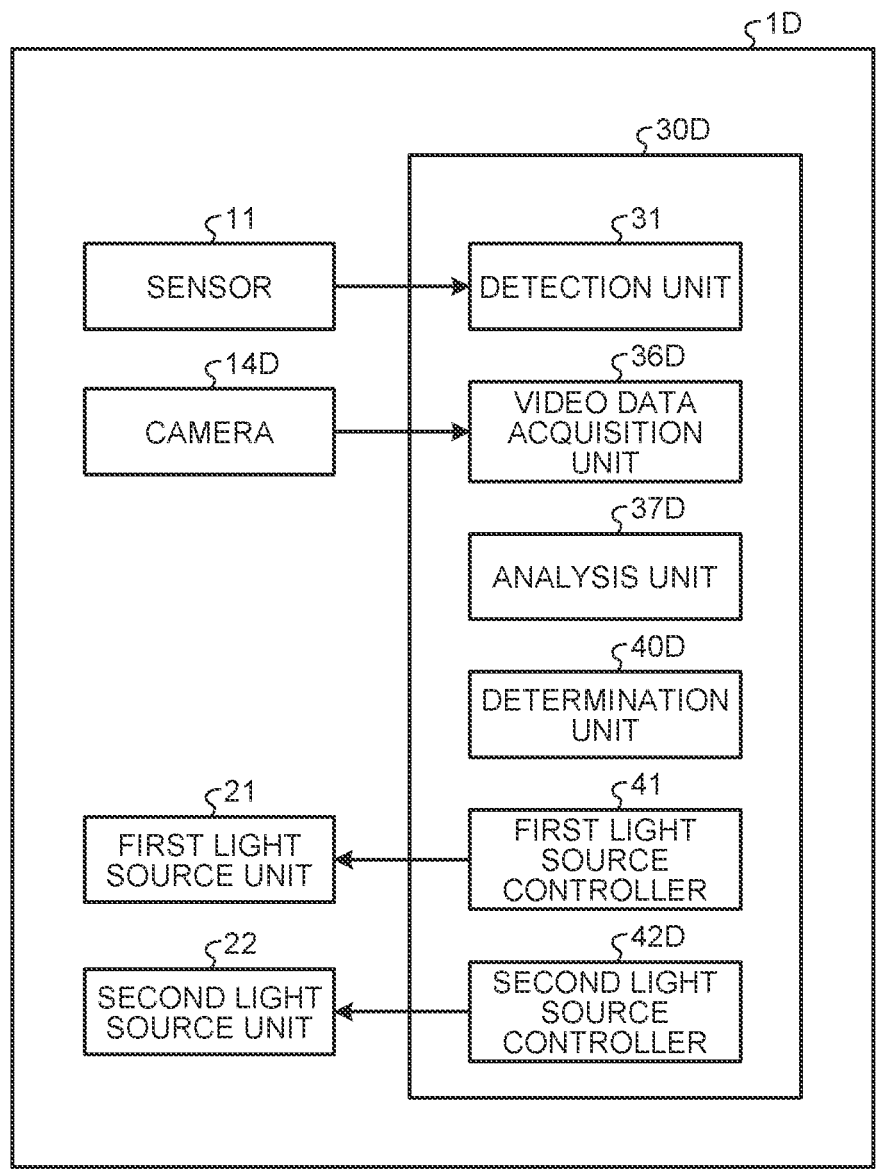
FIG. 10 is a block diagram illustrating an example of a configuration of a display device having a light emission control device according to a fifth embodiment.
Figure 11:
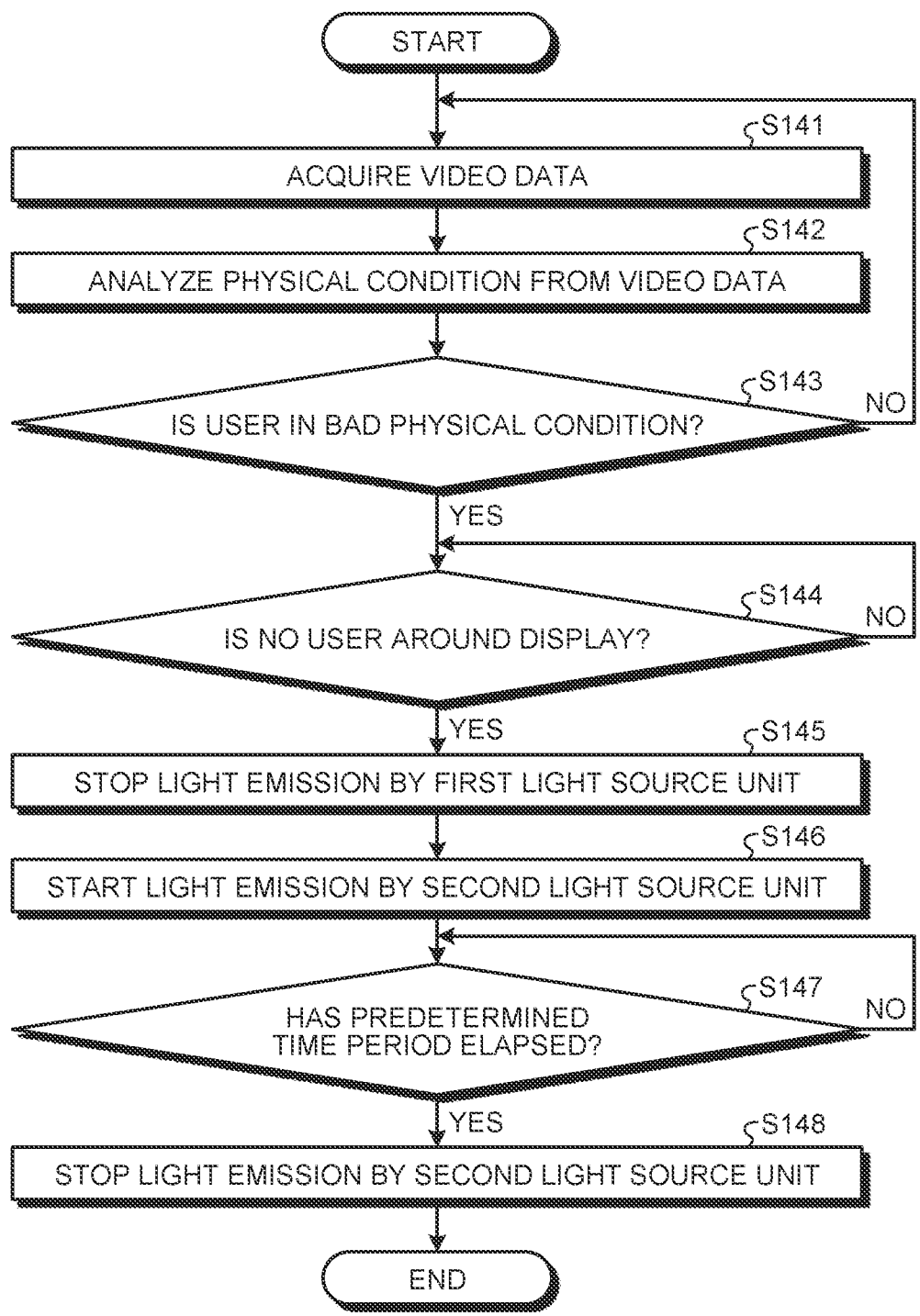
FIG. 11 is a flowchart illustrating a flow of processes at the light emission control device according to the fifth embodiment.

A display device 1D according to a fifth embodiment will be described while reference is made to FIG. 10 and FIG. 11. FIG. 10 is a block diagram illustrating an example of a configuration of the display device 1D having a light emission control device 30D according to the fifth embodiment. FIG. 11 is a flowchart illustrating a flow of processes at the light emission control device 30D according to the fifth embodiment. Basic configurations of the display device 1D and the light emission control device 30D are similar to those of the display device 1 and the light emission control device 30 of the first embodiment. The same or corresponding reference sign will be assigned to any component that is the same as that of the display device 1 and the light emission control device 30 in the following description and detailed description thereof will be omitted.

The display device 1D is different from that of the first embodiment in that the display device 1D has a camera 14D, as well as a video data acquisition unit 36D and an analysis unit 37D that are included in the light emission control device 30D, and in processes at a determination unit 40D and a second light source controller 42D.

The camera 14D captures an image of an area around the display device 1D. The camera 14D outputs video data captured, to the video data acquisition unit 36D.

The video data acquisition unit 36D acquires the video data captured by the camera 14D. The video data acquisition unit 36D outputs the video data acquired, to the analysis unit 37D.

The analysis unit 37D analyzes the video data acquired by the video data acquisition unit 36D. The analysis unit 37D analyzes the video data to detect any user around the main body unit 10 and to analyze the user's physical condition. A method used to detect any user from the video data is not limited and may be a publicly known method. The analysis unit 37D analyzes the same user from the video data. For example, the analysis unit 37D detects the eyes of the same user and analyzes whether or not the eyes are open, in other words, whether or not the pupils of the eyes are detected. The analysis unit 37D may perform the measurement, for the same user, of the number of times of closing of the eyes or the time period of closing of the eyes. In a case in which the same user is no longer recognized, the analysis unit 37D resets the measurement of the number of times or the time period.

Further based on the analysis result from the analysis unit 37D, the determination unit 40D determines whether or not the user around the main body unit 10 is in a bad physical condition. More specifically, further based on the analysis result from the analysis unit 37D, in a case in which the number of times of the closing of the eyes is equal to or more than a threshold or the time period of the closing of the eyes is equal to or longer than a threshold, the determination unit 40D determines that the user is in a bad physical condition.

The threshold for the number of times of the closing of the eyes and the threshold for the time period of the closing of the eyes may be set for a user based on average values calculated for a predetermined time period with respect to the same user in advance.

In a case in which a user is in the bad physical condition, an area around an input device and the main body unit 10 may have become unclean by being used by the user and the area is thus preferably disinfected in preparation for the next use.

Based on the determination result from the determination unit 40D, the second light source controller 42D controls a second light source unit 22 to start emitting light in a case in which a user has been determined to be in the bad physical condition and no user is around the main body unit 10. In this embodiment, based on the determination result from the determination unit 40D, the second light source controller 42D controls the second light source unit 22 to start emitting light in a case in which the user has been determined, from the video data, to be in the bad physical condition and no user is around the main body unit 10.

A flow of processes at the light emission control device 30D will be described next by use of FIG. 11. At Step S144 to Step S148, processes similar to those from Step S102 to Step S106 of the flowchart illustrated in FIG. 3 are performed.

The light emission control device 30D acquires, by the video data acquisition unit 36D, video data from the camera 14D (Step S141). The light emission control device 30D proceeds to Step S142.

The light emission control device 30D analyzes the physical condition from the video data (Step S142). More specifically, the light emission control device 30D detects any user around the main body unit 10 by analyzing the video data by the analysis unit 37D, to make an analysis of whether or not the user's eyes are closed. The light emission control device 30D proceeds to Step S143.

By the determination unit 40D, based on the result of the analysis by the analysis unit 37D, the light emission control device 30D determines whether or not the video data indicate that the user around the main body unit 10 is in the bad physical condition (Step S143). Based on the result of the analysis by the analysis unit 37D, in a case in which the number of times of the closing of the eyes is equal to or more than the detection count threshold, the light emission control device 30D determines, by the determination unit 40D, that the user is in the bad physical condition (Yes at Step S143) and proceeds to Step S144. Based on the result of the analysis by the analysis unit 37D, in a case in which the time period of the closing of the eyes is equal to or longer than the detection time threshold, the light emission control device 30D determines, by the determination unit 40D, that the user is in the bad physical condition (Yes at Step S143) and proceeds to Step S144. Based on the result of the analysis by the analysis unit 37D, in a case in which the number of times of the closing of the eyes is less than the detection count threshold, the light emission control device 30D determines, by the determination unit 40D, that the user is not in the bad physical condition (No at Step S143) and the light emission control device 30D executes the process at Step S141 again. Based on the result of the analysis by the analysis unit 37D, in a case in which the time period of the closing of the eyes is less than the detection time threshold, the light emission control device 30D determines, by the determination unit 40D, that the user is not in the bad physical condition (No at Step S143) and the light emission control device 30D executes the process at Step S141 again.

As described above, this embodiment enables disinfection in a case in which a user is predicted to be in a bad physical condition from video data.

Sixth Embodiment

Figure 12:
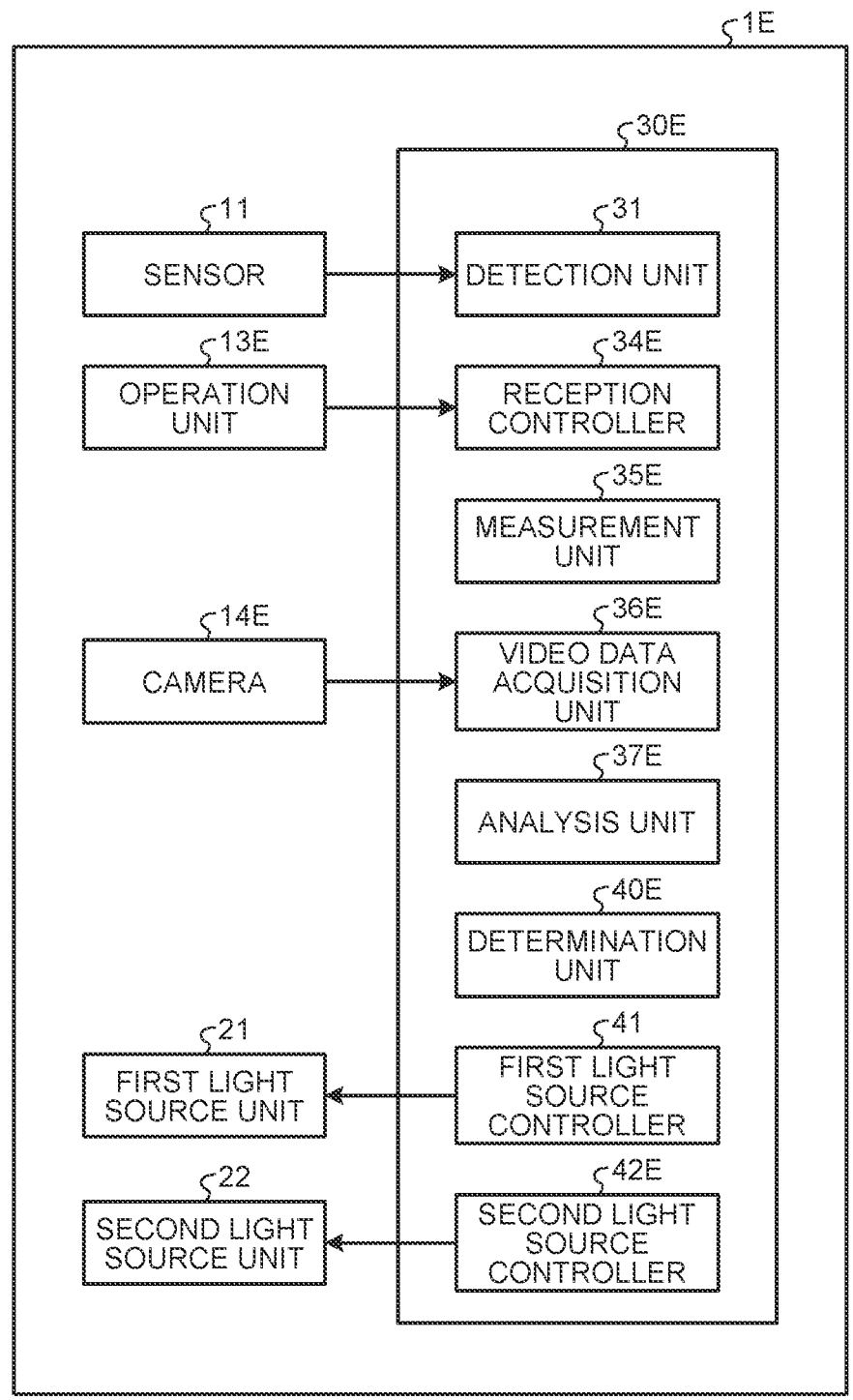
FIG. 12 is a block diagram illustrating an example of a configuration of a display device having a light emission control device according to a sixth embodiment.

A display device 1E according to a sixth embodiment will be described while reference is made to FIG. 12 and FIG. 13. FIG. 12 is a block diagram illustrating an example of a configuration of the display device 1E having a light emission control device 30E according to the sixth embodiment. FIG. 13 is a flowchart illustrating a flow of processes at the light emission control device 30E according to the sixth embodiment. Basic configurations of the display device 1E and the light emission control device 30E are similar to those of the display device 1 and the light emission control device 30 of the first embodiment. The same or corresponding reference sign will be assigned to any component that is the same as that of the display device 1 and the light emission control device 30 in the following description and detailed description thereof will be omitted.

The display device 1E is different from that of the first embodiment in that the display device 1E has an operation unit 13E and a camera 14E, as well as a video data acquisition unit 36E, a measurement unit 35E, and an analysis unit 37E that are included in the light emission control device 30E, and in processes at a determination unit 40E and a second light source controller 42E.

The operation unit 13E and the measurement unit 35E are similar to the operation unit 13B and measurement unit 35B of the third embodiment. The camera 14E and the video data acquisition unit 36E are similar to the camera 14D and the video data acquisition unit 36D of the fifth embodiment.

The analysis unit 37E detects any user around the main body unit 10 to recognize whether or not the user is the same user. Based on a measurement result from the measurement unit 35E, the analysis unit 37E analyzes a typing speed of the same user. The analysis unit 37E may analyze whether or not the typing speed is slower than a past typing speed stored in a storage not illustrated in the drawings, for the same user.

Based on the measurement result from the measurement unit 35E and the analysis result from the analysis unit 37E, in a case in which the typing speed is equal to or less than a threshold for the same user, the determination unit 40E determines that the user is in a bad physical condition. Based on the measurement result from the measurement unit 35E and the analysis result from the analysis unit 37E, in a case in which the typing speed is slower than the past typing speed for the same user, the determination unit 40E may determine that the user is in a bad physical condition.

Based on the determination result from the determination unit 40E, in a case in which a user is determined, based on the typing speed, to be in the bad physical condition and no user is around the main body unit 10, the second light source controller 42E controls a second light source unit 22 to start emitting light.

A flow of processes at the light emission control device 30E will be described next by use of FIG. 13. At Step S151, a process similar to that of Step S141 in the flowchart illustrated in FIG. 11 is performed. At Step S152, a process similar to that of Step S121 in the flowchart illustrated in FIG. 7 is performed. At Step S155 to Step S159, processes similar to those from Step S102 to Step S106 of the flowchart illustrated in FIG. 3 are performed.

By the analysis unit 37E, the light emission control device 30E makes an analysis of a typing speed from the operation information (Step S153). The light emission control device 30E then proceeds to Step S154.

By the determination unit 40E, the light emission control device 30E determines, based on the result of the analysis by the analysis unit 37E, whether or not the typing speed is equal to or less than the threshold (Step S154). In a case in which the light emission control device 30E determines, by the determination unit 40E, that the typing speed is equal to or less than the threshold (Yes at Step S154), the light emission control device 30E proceeds to Step S155. In a case in which the light emission control device 30E determines, by the determination unit 40E, that the typing speed is not equal to or less than the threshold (No at Step S154), the light emission control device 30E executes the process at Step S152 again.

As described above, this embodiment enables disinfection in a case in which a user is predicted to be in a bad physical condition from operation information.

The light emission control device 30 and the display device 1 according to the present application have been described thus far, but implementation in various different modes other than the above described embodiments is possible.

Each component of the light emission control device 30 and display device 1 has been functionally and/or conceptually illustrated in the drawings, and is not necessarily configured physically as illustrated in the drawings. That is, the specific form of each device is not limited to the one illustrated in the drawings, and all or a part of each device may be functionally or physically separated or integrated in any units according to, for example, the processing load on the device and the use situation of the device.

A configuration of the light emission control device 30 is, for example, implemented as software by programs loaded into a memory. With respect to the embodiments, functional blocks implemented by cooperation among these pieces of hardware or pieces of software have been described above. That is, these functional blocks may be implemented in any of various forms, by hardware only, software only, or a combination of hardware and software.

The components described above include one that can easily be thought of by a person skilled in the art, one that is practically identical, and one that is within an equivalent range. Furthermore, the components described above may be combined appropriately. Moreover, within the scope not departing from the gist of the embodiments described above, various omission, replacement, and modifications of the components may be made.

The second light source controller 42 may cause one of the multiple second light source units 22 to emit light, the one corresponding to the second light source unit 22 that irradiates a range touched by the user with the user's hand, with light. The range touched by the user with the user's hand may be detected by analysis of the video data captured by the camera or by analysis of operation information on the operation unit.

The present application may be used for, for example, a display device for a computer, or an image reading device.

According to the present application, any part touched by the user with the user's hand when the user checks images displayed on the display device, for example, is able to be adequately disinfected.

Although the application has been described with respect to specific embodiments for a complete and clear application, the appended claims are not to be thus limited but are to be construed as embodying all modifications and alternative constructions that may occur to one skilled in the art that fairly fall within the basic teaching herein set forth.

What is claimed is:

1. A light emission control device, comprising:
   a detection unit configured to detect a user around a display device;
   a disinfection light source controller configured to control a disinfection light source unit of a wavelength having a disinfecting effect;
   a light source controller configured to control a light source unit of a wavelength different from the wavelength having the disinfecting effect; and
   a determination unit configured to determine, based on a detection result by the detection unit, whether no user is around the display device, wherein
   in a case in which the determination unit determines that no user is around the display device, the light source controller is further configured to control the light source unit to stop emitting light therefrom, and the disinfection light source controller is further configured to control the disinfection light source unit to start emitting light therefrom.

2. The light emission control device according to claim 1, further comprising:

a sound data acquisition unit configured to acquire sound data from a microphone that collects sound around the display device; and a sound analysis unit configured to analyze the sound data acquired by the sound data acquisition unit, wherein the determination unit is further configured to determine, based on an analysis result by the sound analysis unit, whether a sound condition is satisfied, by determining whether a number of times of detection of sound is equal to or more than a detection count threshold or whether a time period of detection of sound is equal to or longer than a detection time threshold, and the disinfection light source controller is further configured to control, in a case in which the determination unit determines that the sound condition is satisfied and no user is around the display device, the disinfection light source unit to start emitting light therefrom.

3. The light emission control device according to claim 1, further comprising:

a reception controller configured to control reception of operation on an operation unit that receives operation for the display device; and a measurement unit configured to measure a number of times of operation on the operation unit or a time period of operation on the operation unit, wherein the determination unit is further configured to determine, based on a measurement result by the measurement unit, whether an operation condition is satisfied, by determining whether the number of times of operation exceeds an operation count threshold or whether the time period of operation exceeds an operation time threshold, and the disinfection light source controller is further configured to control, in a case in which the determination unit determines that the operation condition is satisfied and no user is around the display device, the disinfection light source unit to start emitting light therefrom.

4. The light emission control device according to claim 1, further comprising a notification controller configured to control notification of a lighting state of the disinfection light source unit.

5. A display device, comprising:
the light emission control device according to claim 1;
the disinfection light source unit; and
the light source unit.

* * * * *